United States Patent [19]

Dumbser et al.

[11] Patent Number: 4,835,468
[45] Date of Patent: May 30, 1989

[54] RELEASABLY MOUNTED INSTRUMENT ASSEMBLY FOR A BICYCLE HAVING ELASTOMERIC ELECTRICAL CONTACTS

[75] Inventors: Gerhard Dumbser, Niederwerrn; Rainer Fey; Günter Nürnberger, both of Schweinfurt, all of Fed. Rep. of Germany

[73] Assignee: Sachs-Huret S.A., Nanterre, France

[21] Appl. No.: 127,495

[22] Filed: Dec. 1, 1987

[30] Foreign Application Priority Data

Dec. 11, 1986 [DE] Fed. Rep. of Germany ....... 3642354

[51] Int. Cl.⁴ .............. G01R 1/04; G01P 3/00
[52] U.S. Cl. .................... 324/166; 324/156; 439/527; 340/432
[58] Field of Search .............. 324/160, 166, 175, 156, 324/115, 208; 73/431, 493, 494; 280/289 R, 289 H; 439/34–36, 527; 340/134, 671; 361/369–372

[56] References Cited

U.S. PATENT DOCUMENTS 3,287,980 11/1966 Gilliland ................. 73/431
3,898,563 8/1975 Erisman .................. 340/134 X
4,473,251 9/1984 Murayama ................ 340/134 X
4,479,693 10/1984 Uyeda et al. ............... 439/527
4,642,606 2/1987 Tsuyama ................. 340/134

Primary Examiner—Reinhard J. Eisenzopf
Assistant Examiner—Jack B. Harvey
Attorney, Agent, or Firm—Toren, McGeady & Associates

[57] ABSTRACT

An electronic instrument is mounted on a handlebar of a bicycle. An instrument carrier is fastened to the handlebar. The instrument itself is engageable with the instrument carrier for holding engagement. A signal receiver is fastened to one leg of a fork which carries a bicycle wheel. The receiver is opposite the bicycle wheel. A signal inducer is mounted on a spoke of the bicycle wheel. The signal inducer generates signals within the signal receiver. These signals are supplied from the signal receiver by a cable to the instrument carrier. The instrument carrier is provided with contacts. Complementary contacts are provided on the instrument. When the instrument is engaged with the instrument carrier the electrical contacts of the instrument carrier and of the instrument come in mutual electrical engagement. At least one of the contacts is provided on a silicon rubber block which is elastically deformable when the contacts of the instrument carrier and the instrument are brought in electric connection.

18 Claims, 3 Drawing Sheets

RELEASABLY MOUNTED INSTRUMENT ASSEMBLY FOR A BICYCLE HAVING ELASTOMERIC ELECTRICAL CONTACTS

BACKGROUND OF THE INVENTION

Measuring instruments are frquently provided on the handlebar of a bicycle for indicating to the cyclist relevant operational data like the actual speed or the covered distance. These instruments are detachably mounted on the handlebar so that they can be removed particularly in view of the danger of theft when the bicycle is parked in a place accessible to the public. The electronic instrument is supplied with signals from a signal receiver which is mounted on a fork leg of a bicycle fork unit carrying a bicycle wheel. The signals are generated in the signal receiver by a signal inducer fastened to a spoke of the respective wheel. In order to permit easy detachment of the instrument from the instrument carrier fixed to the handlebar the cable is connected to the instrument carrier and is in electrical connection with electrical contacts provided on the instrument carrier. Counter-contacts are provided on the instrument. The counter-contacts are electrically connected to the contacts when the instrument is engaged with the instrument carrier.

STATEMENT OF THE PRIOR ART

In the prior art it is known to provide sliding contacts both on the instrument and the instrument carrier. The instrument is engaged with the instrument carrier by a sliding movement in which the sliding contacts slide with respect to each other. The sliding contacts are provided with a highly conductive surface layer, for example with a gold layer. These highly conductive layers are necessary for transmitting the very low voltage or current pulses from the receiver through the sliding contacts to the instrument. However after a number of detachment and remounting operations the sliding contacts are worn so that the pulse transmission is not further possible. There is also a risk of oxidation of the slide contacts.

OBJECT OF THE INVENTION

It is an object of the present invention to provide an instrument assembly in which even after many detachment and remounting operations the current transmission is not deteriorated.

SUMMARY OF THE INVENTION

This invention relates to an instrument assembly for use on a vehicle, and more particularly on a bicycle or the like. The instrument assembly comprises an instrument carrier unit. This instrument carrier unit includes fastening means for fastening the instrument carrier unit to a carrier part of the respective vehicle, e.g. the handlebar of a bicycle, and further includes carrier-side engagement means and signal supply means adapted for electric connection with signal generating means. The signal supply means have carrier-side contact means. The instrument assembly further comprises an instrument unit. This instrument unit includes electric circuit means, measuring value read-out means connected to the circuit means, instrument-side contact means connected to the circuit means and instrument-side engagement means. The instrument-side engagement means are engageable with the carrier-side engagement means such as to releasably fasten the instrument unit on the instrument carrier unit. The instrument-side contact means come into electrical contact with the carrier-side contact means when the instrument-side engagement means are engaged with the carrier-side engagement means. At least one of the instrument carrier unit and the instrument unit comprises an elastomeric block. This elastomeric block has at least one electrically conductive zone. This electrically conductive zone acts as at least a part of one of the carrier-side and the instrument-side contact means.

The electrically conductive zone of the elastomeric block is not subject to deterioration even after frequent detaching and remounting operations. Moreover, the elastomeric block provides a high elasticity, so that intimate electric contact is obtained between the respective contact means on the instrument unit and on the instrument carrier unit.

According to a preferred embodiment of the invention the elastomeric block is generally made of electrically non-conductive material and comprises two main side faces opposite each other. The electrically conductive zone is made by a column of electrically conductive elastomeric material within the electrically non-conductive material. This column extends between the two main side faces. With such an embodiment it is easily possible to provide a plurality of electrically conductive zones which are electrically insulated from each other.

The elastomeric block can be mounted on the instrument unit. The electrically conductive zone can be in electrical contact with the circuit means of the instrument unit. In this case the carrier-side contact means comprise at least one carrier-side contact member elastically engaging the electrically conductive zone of the elastomeric block when the instrument-side engagement means are engaged with the carrier-side engagement means. In order to protect the interior parts of the instrument unit against external influences, particularly against dust, water and water vapor, the instrument unit comprises a substantially closed housing. In such housing an opening is provided for permitting contact of the electrically conductive zone and the carrier-side contact member. This operning of the housing can be sealingly closed by the elastomeric block.

Conventionally the circuit means comprise a printed circuit board with at least one printed circuit path thereon. This printed circuit path can be in electric contact with the electrically conductive zone of the elastomeric block The instrument unit comprises conventionally a compartment for accommodating an electric cell therein. This electric cell is also electrically connectable to the circuit means.

The elastomeric block can also be useful for the mechanical fastening of the instrument unit to the instrument carrier unit: the elastomeric block can be compressible between respective abutment faces of the instrument unit and the carrier unit when the instrument-side engagement means and the carrier-side engagement means are engaged with each other. Under these circumstances the instrument-side engagement means and the carrier-side engagement means are tensioned against each other as a result of the compression of the elastomeric block.

The elastomeric block may be made of silicon rubber. The electrically conductive zone can in such case be made of silicon rubber containing electrically conductive particles, such as carbon particles.

The read-out means can comprise, as is conventional, a display screen.

The signal supply means can comprise at least one cable electrically connected to the instrument-side contact means.

The signal-generating means comprise, as usually, at least one signal receiver unit adapted for being fastened to a stationary part of a vehicle frame, and at least one signal inducer element adapted for being fastened on a rotating part of the respective vehicle. For example a signal receiver unit may be provided adjacent to a wheel of the respective vehicle and the signal inducer element may be provided on the respective wheel Alternatively, a signal receiver unit may be provided adjacent to a foot pedal of the respective vehicle and a signal inducer element may be provided on the respective foot pedal. Thus it is possible to evaluate both the r.p.m. of the wheel and the r.p.m. of the foot pedal.

According to a preferred embodiment the carrier-side engagement means and the instrument-side engagement means comprise a first carrier-side engagement element and a first instrument-side engagement element which are engageable with each other and define—when mutually engaged—a pivoting axis for pivoting the instrument unit with respect to the carrier unit about the pivoting axis. Thus the instrument-side contact means and the carrier-side contact means are engageable with each other in the course of a pivoting movement of the instrument unit with respect to the carrier unit. The pivoting movement is limited by the contact of the carrier-side contact means and the instrument-side contact means. For fastening the instrument unit against pivotal movement the carrier-side engagement means and the instrument-side engagement means further comprise a carrier-side snap element and an instrument-side snap element, respectively. The snap elements engage each other when or after the instrument-side contact means and the carrier-side contact means have been brought into electrical contact. With this embodiment no sliding movement of the contact means occurs on detaching and remounting the instrument unit.

The carrier-side engagement means may additionally comprise an engagement block and the instrument-side engagement means comprise in such case an engagement recess receiving the engagement block. The engagement block carries at least one contact member forming said carrier-side contact means. The engagement recess is provided with an opening opposite said engagement member. The opening can be closed by the elastomeric block which is mounted on the instrument unit. The contact member engages the elastomeric block through the opening.

The various features of novelty which characterize the invention are pointed out with particularity in the claims annexed to and forming a part of this disclosure. For a better understanding of the invention, its operating adavantages and specific objects attained by its use, reference should be had to the accompanying drawings and descriptive matter in which there is illustrated and described a preferred embodiment of the invention.

BRIEF DESCRIPTION OF THE DRAWINGS

The invention will be explained in greater detail hereinafter with reference to an embodiment shown in the accompanying drawings, in which.

DESCRIPTION OF THE PREFERRED EMBODIMENT

Figure 1:
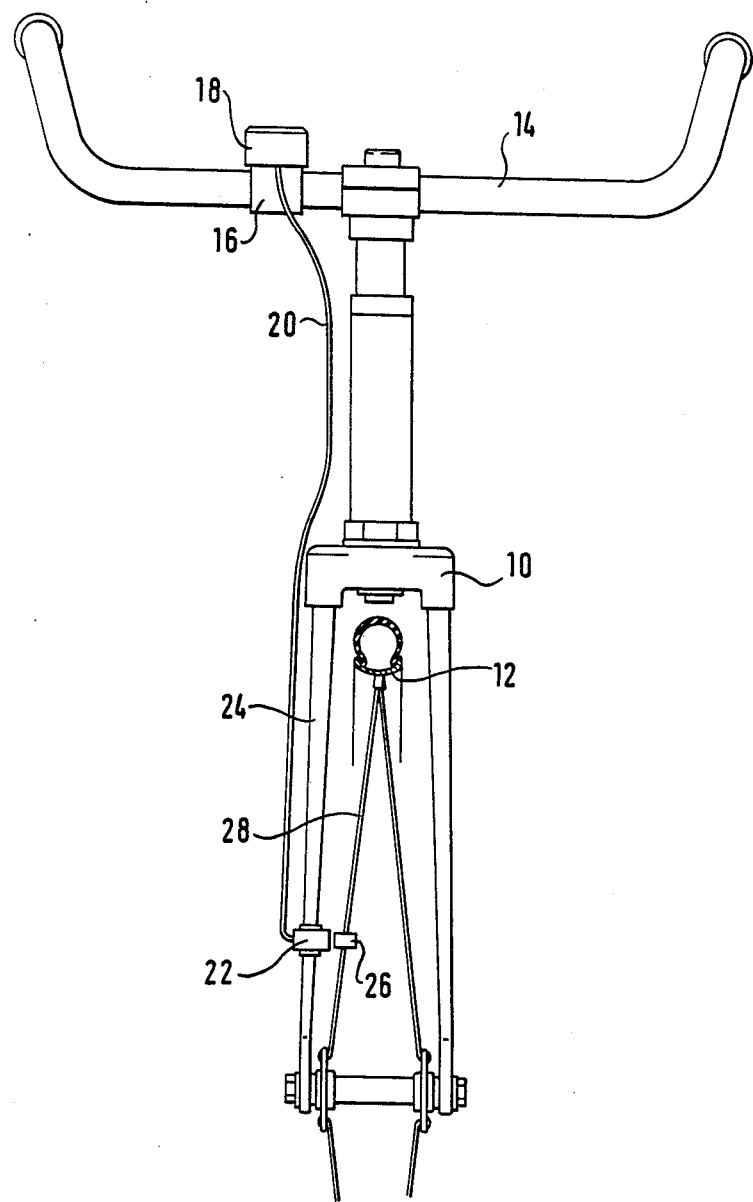
FIG. 1 shows a bicycle with an instrument assembly.

In FIG. 1 there is shown a bicycle with a forward fork unit 10 and a wheel 12. A handlebar is designated by 14. On the handlebar 14 there is fastened an instrument carrier unit 16. An instrument unit 18 is releasably fastened to the instrument carrier unit 16. A cable 20 connects the instrument carrier unit 16 with a signal receiver 22. The signal receiver 22 is fastened to a leg 24 of the fork unit 18. A signal inducer 26 is fastened to a spoke 28 of the wheel 12. The signal inducer 26 induces electrical pulses in the receiver element 22. These electrical pulses or signals are transmitted through the cable 20 to the instrument carrier unit 16.

The instrument unit comprises a housing 30 with a measuring value display screen 32 and a printed circuit board 34. Electrical components like amplifiers, memories and microcomputers may be connected to the printed circuit board. The housing 30 comprises a compartment 36 receiving an electric cell 38. This compartment 36 is closed by a cover 40 at the lower side of the housing 30. In a lower wall 42 of the housing 30 there is provided a recess 44. This recess is provided with an opening 46. This opening opens into a block receiving chamber 48 receiving an elastomeric block 50. The elastomeric block 50 is accommodated between the printed circuit board 34 and the opening 46 within the chamber 48. The printed circuit board 34 defines an upper abutment face for the elastomeric block 50 and a lower abutment face 52 is defined by a flange 52 surrounding the opening 46. The elastomeric block is shown more detailed in an enlarged plan view in FIG. 2a. This block 50 comprises two main side faces 54 and 56. Columns 58 of electroconductive material extend between the faces 54 and 56. These columns 58 are made of elastomeric silicon rubber which is enriched with carbon particles. Outside the columns 58 the block 50 consists of non-conductive silicon rubber.

The housing 30 is provided with an engagement claw 60 and an engagement groove 62.

Figure 3:
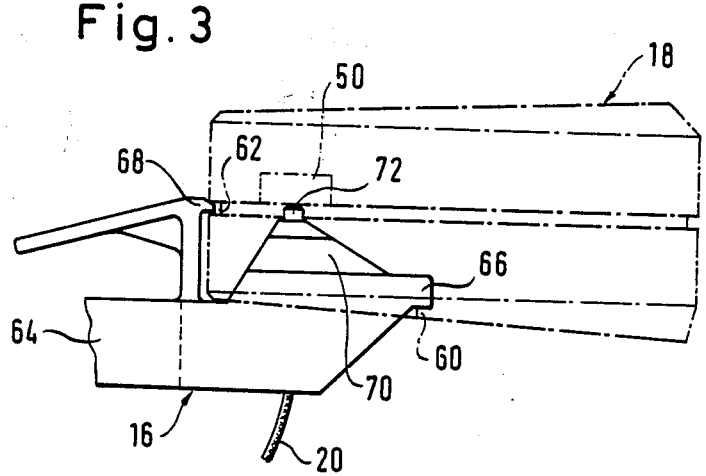
FIG. 3 shows the instrument carrier unit with the instrument unit fastened thereon in side elevation, the instrument unit being shown in dotted lines.
Figure 4:
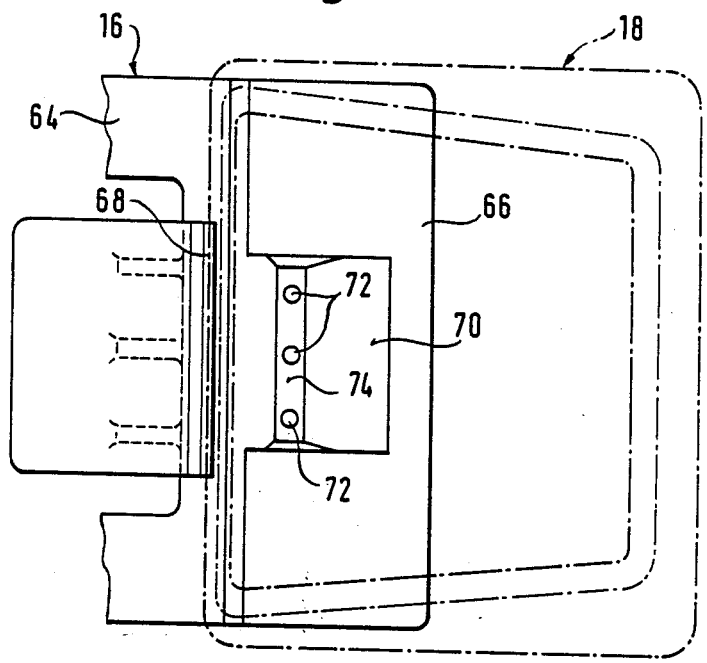
FIG. 4 shows a plan view of the instrument carrier unit with the instrument unit being shown in dotted lines.

In FIGS. 3 and 4 the instrument carrier unit 16 is shown in more detail. This instrument carrier unit 16 comprises a base member 64. This base member 64 is provided with an engagement edge 66 for being engaged by the engagement claw 60 and an elastically deformable engagement hook 68 for engagement into the engagement groove 62.

Moreover there is provided on the base member 64 a roof-shaped block 70 for engagement with the recess 44 of the housing 30. In the block 70 there are embedded contact members 72 which protrude beyond an upper end face 74 of the block 70. The contact members 72 are arranged in register with the columns 58 of the block 54.

When the instrument unit 18 is to be mounted on the instrument carrier unit 16 first of all the engagement claw 60 is engaged with the engagement edge 66 so that the engagement claw 60 and the engagement edge 66 define a pivot axis. Hereupon the instrument unit 18 is pivoted about this axis until the engagement hook 68 elastically engages the engagement groove 62. Now the instrument unit 18 is releasably fastened to the instrument carrier unit. The upper face 74 of the block 70 passes through the opening 46 and abuts against the elastomeric block 50 such that the block 50 is compressed. This compression of the block 50 maintains the engagement of the engagement hook 68 and the engagement groove 62. Simultaneously the contact members 72 are in engagement with the contact columns 58 of the elastomeric block 50. The upper ends of the columns 58 are in contact with current paths (not shown) provided on the printed circuit board 34. The contact members 72 are connected to the cable 20 and by the cable 20 to the receiver element 22. So the electric connection between the receiver element 22 and the printed circuit board 34 is established.

Figure 2:
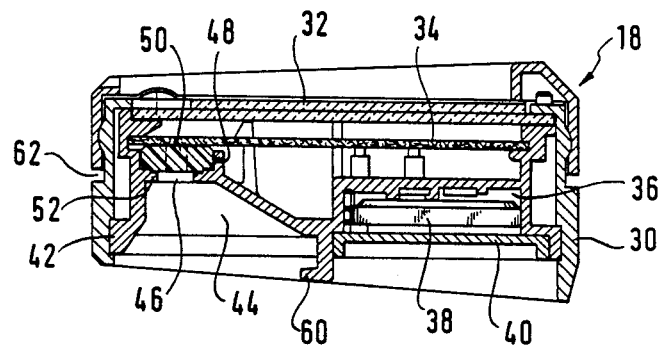
FIG. 2 shows a longitudinal section through the instrument unit.
Figure 2A:
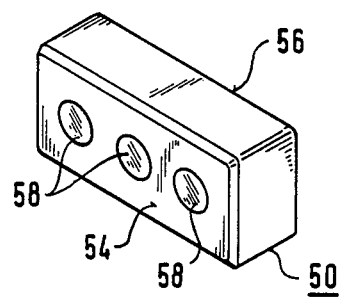
FIG. 2a shows a plan view of an elastomeric block.

It is to be noted that the engagement claw 60 can also be shaped such as to project to the right in FIG. 2. In such case the engagement edge 66 is to be replaced by an engagement slot for engagement of the reversed engagement claw.

It is further to be noted that the receiver unit 22 may also be provided at the backward wheel of the bicycle or opposite a foot pedal (not shown).

While a specific embodiment of the invention has been shown and described in detail to illustrate the application of the inventive principles, it will be understood that the invention may be embodied otherwise without departing from such principles.

The reference numerals in the claims are only used for facilitating the understanding and are by no means restrictive.

What is claimed is:

1. An instrument assembly for use on a vehicle, and more particularly on a two-wheel vehicle as a bicycle, said instrument assembly comprising
    an instrument carrier unit (16), said instrument carrier unit including fastening means for fastening said instrument carrier unit (16) to a carrier part (14) of the respective vehicle,
    carrier-side engagement means (66, 68) and signal supply means (20) adapted for electric connection with signal generating means (22, 26), said signal supply means (20) having carrier-side contact means (72),
    said instrument assembly further comprising an instrument unit (18), said instrument unit (18) including electric circuit means (34),
    measuring value read-out means (32) connected to said circuit means (34), instrument-side contact mean (58) connected to said circuit means (34) and instrument-side engagement means (60, 62), said instrument-side engagement means (60, 62) being engageable with said carrier-side engagement (66, 68) such as to releasably fasten said instrument unit (18) on said instrument carrier unit (16), said instrument-contact means (58) being in electrical contact with said carrier-side contact means (72) when said instrument-side engagement means (60, 62) are engaged with said carrier-side engagement means (66, 68),
    at least one of said instrument carrier unit (16) and said instrument unit (18) comprising an elastomeric block (50), said elastomeric block (50) having at least one elastomeric electrically conductive zone (58), said elastomeric electrically conductive zone (58), acting as at least a part of one of said carrier-side (72) and said instrument-side contact means (58).

2. An instrument assembly as set forth in claim 1, said elastomeric block (50) being generally made of electrically non-conductive material and comprising two main side faces (54, 56) opposite each other, said at least one electrically conductive zone (58) being made by a column (58) of electrically conductive elastomeric material within said electrically non-conductive material, said column (58) extending between said two main side faces (54, 56).

3. An instrument assembly as set forth in claim 1, said elastomeric block (50) comprising a plurality of electrically conductive zones (58) which are electrically insulated from each other.

4. An instrument assembly as set forth in claim 1, said elastomeric block (50) being mounted on said instrument unit (18), said at least one electrically conductive zone (58) being in electrical contact with said circuit means (34), said carrier-side contact means (72) comprising at least one carrier-side contact member (72) elastically engaging said electrically conductive zone (58) of said elastomeric block (50) when said instrument-side engagement means (60, 62) are engaged with said carrier-side engagement means (66, 68).

5. An instrument assembly as set forth in claim 4, said instrument unit (18) comprising a substantially closed housing (30), said closed housing (30) having an opening (46) for permitting contact of said at least one electrically conductive zone (58) and said at least one carrier-side contact member (72), said opening (46) of said housing (30) being sealingly closed by said elastomeric block (50).

6. An instrument assembly as set forth in claim 4, said circuit means (34) comprising a printed circuit board (34) with at least one printed circuit path thereon, said at least one printed circuit path being in electric contact with said at least one electrically conductive zone (58) of said elastomeric block (50).

7. An instrument assembly as set forth in claim 1, said instrument unit (18) comprising a compartment (36) for accommodating an electric cell (38), said electric cell (38) being electrically connectable to said circuit means (34).

8. An instrument assembly as set forth in claim 1, said elastomeric block (50) being compressible between respective abutment faces (34, 74) of said instrument unit (18) and said carrier unit (16) when said instrument-side engagement means (60, 62) and said carrier-side engagement means (66, 68) are engaged with each other, said instrument-side engagement means (60, 62) and said carrier-side engagement means (66, 68) being tensioned against each other as a result of the compression of said elastomeric block (50).

9. An instrument assembly as set forth in claim 1, said elastomeric block (50) being made of silicon rubber, said at least one electrically conductive zone (58) being made of said silicon rubber containing electrically conductive particles, such as carbon particles.

10. An instrument assembly as set forth in claim 1, said read-out means (32) comprising a display screen (32).

11. An instrument assembly as set forth in claim 1, said signal supply means (20) comprising at least one cable (20) electrically connected to said instrument-side contact means (72).

12. An instrument assembly as set forth in claim 1, said signal-generating means (22, 26) comprising at least one signal receiver unit (22) adapted for being fastened to a stationary part (24) of a vehicle frame, and at least one signal inducer element (26) adapted for being fastened on a rotating part (28) of the respective vehicle.

13. An instrument assembly as set forth in claim 12, a signal receiver unit (22) being provided adjacent to a wheel (12) of the respective vehicle and the signal inducer element (26) being provided on the respective wheel (12).

14. An instrument assembly as set forth in claim 12, a signal receiver unit being provided adjacent to a foot pedal of the respective vehicle and a signal inducer element being provided on the respective foot pedal.

15. An instrument assembly as set forth in claim 1, said carrier-side engagement means (66, 68) and said instrument-side engagement means (60, 62) comprising a first carrier-side engagement element (66) and a first instrument-side engagement element (60) which are engageable with each other and define - when mutually engaged - a pivoting axis for pivoting said instrument unit (18) with respect to said carrier unit (16) about said pivoting axis, said instrument-side contact means (58) and said carrier-side contact means (72) being engageable with each other in the course of a pivoting movement of said instrument unit (18) with respect to said carrier unit (16), said pivoting movement being limited by said carrier-side contact means (72) and said instrument-side contact means (58), said carrier-side engagement means (66, 68) and said instrument-side engagement means (60, 62) further comprising a carrier-side snap element (68) and an instrument-side snap element (62), respectively, said snap elements (68, 62) engaging each other when or after said instrument-side contact means (58) and said carrier-side contact means (72) have been brought into electric contact.

16. An instrument assembly as set forth in claim 15, said carrier-side engagement means (66, 68) comprising an engagement block (70) and said instrument-side engagement means (60, 62) comprising an engagement recess (44) receiving said engagement block (70), said engagement block (70) carrying at least one contact member (72) forming said carrier-side contact means (72), said engagement recess (44) being provided with an opening (46) opposite said engagement member (70), said opening (46) being closed by said elastomeric block (50) being mounted on said instrument unit (18), said contact member (72) engaging said elastomeric block (50) through said opening (46).

17. An instrument assembly as set forth in claim 1, wherein said elastomeric block (50) being a rubber-elastic block (50), said electrically conductive zone (58) being also of rubber-elastic material.

18. An instrument assembly for use on a vehicle, and more particularly on a bicycle, said instrument assembly comprising an instrument carrier unit (16), said instrument carrier unit including fastening means for fastening said instrument carrier unit (16) to a carrier part (14) of the respective vehicle, carrier-side engagement means (66, 68) and signal supply means (20) adapted for electric connection with signal generating means (22, 26), said signal supply means (20) having carrier-side contact means (72), said instrument assembly further comprising an instrument unit (18), said instrument unit (18) including electric circuit means (34), measuring value read-out means (32) connected to said circuit means (34), instrument-side contact means (58) connected to said circuit means (34) and instrument-side engagement means (60, 62), said instrument-side engagement means (60, 62), being engageable with said carrier-side engagement (66, 68) such as to releasably fasten said instrument unit (18) on said instrument carrier unit (16), said instrument-contact means (72) when said instrument-side engagement means (60, 62) are engaged with said carrier-side engagement means (66, 68), at least one of said instrument carrier unit (16) and said instrument unit (18) comprising an elastomeric block (50), said elastomeric block (50) having at least one elastomeric electrically conductive zone (58), said elastomeric electrically conductive zone (58) acting as at least a part of one of said carrier-side (72) and said instrument-side contact means (58), said elastomeric block (50) being generally made of electrically non-conductive material and comprising two main side faces (54, 56) opposite each other, said at least one electrically conductive zone (58) being made of a column (58) of electrically conductive elastomeric material within said electrically non-conductive material, said column (58) extending between two main side faces (54, 56), said elastomeric block comprising a plurality of electrically conductive columns (58) which are electrically insulated from each other, said elastomeric block (50) being mounted on said instrument unit (18), said electrically conductive columns (58) being in electrical contact with said circuit means (34), said carrier-side contact means (72) comprising at least one carrier-side contact member (72) electrically engaging said electrically conductive columns (58) of said elastomeric block (50) when said instrument-side engagement means (60, 62) are engaged with said carrier-side engagement means (66, 68) and said elastomeric block (50) being a rubber-elastomeric block (50), and said electrically conductive column (58) also being of rubber-elastic material.

* * * * *